United States Patent
Gupta et al.

(10) Patent No.: US 10,204,018 B1
(45) Date of Patent: Feb. 12, 2019

(54) SYSTEMS AND METHODS FOR OPTIMIZING MULTIPLE DATA STREAMS THROUGHPUT FROM SINGLE HOST OR STORAGE SYSTEM TO MAXIMIZE OVERALL THROUGHPUT

(71) Applicant: EMC Corporation, Hopkinton, MA (US)

(72) Inventors: Rajendra Kumar Gupta, Bangalore (IN); Anupam Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 722 days.

(21) Appl. No.: 14/326,275

(22) Filed: Jul. 8, 2014

(51) Int. Cl.
*G06F 11/14* (2006.01)

(52) U.S. Cl.
CPC .................. *G06F 11/1464* (2013.01)

(58) Field of Classification Search
CPC .................................................. G06F 11/1464
USPC ........................................................ 707/654
See application file for complete search history.

(56) References Cited

U.S. PATENT DOCUMENTS

| | | | | |
|---|---|---|---|---|
| 6,934,724 | B1 * | 8/2005 | Deshayes | G06F 11/1464 |
| 8,121,034 | B2 * | 2/2012 | Guillouard | H04L 41/0896 370/230 |
| 9,348,519 | B1 * | 5/2016 | Gupta | G06F 3/0613 |
| 2009/0313626 | A1 * | 12/2009 | Dawson | G06Q 10/06 718/100 |
| 2011/0082972 | A1 * | 4/2011 | Cherkasova | G06F 11/1461 711/111 |
| 2012/0084501 | A1 * | 4/2012 | Watanabe | G06F 11/3485 711/112 |
| 2014/0040573 | A1 * | 2/2014 | Cherkasova | G06F 11/1461 711/162 |

* cited by examiner

*Primary Examiner* — Hicham Skhoun
(74) *Attorney, Agent, or Firm* — Workman Nydegger

(57) ABSTRACT

In one example, a method for determining an optimized data backup throughput rate is provided. The example method includes calculating a total saveset size DS(total) for a backup by summing sizes DS(n) of each of 'n' savesets, each of the savesets being associated with a respective savestream, and then calculating a total throughput rate PTP(total) for the backup by summing respective throughput rates TP of each of the 'n' savesets. The method further includes calculating a total backup window length PTIME(total) using the following formula: PTIME(total)=DS(total)/PTP (total). Finally, an optimized savestream throughput rate OTP(n) is calculated for each of the 'n' savesets using the following formula: OTP(n)=DS(n)/PTIME(total).

16 Claims, 7 Drawing Sheets

SYSTEMS AND METHODS FOR OPTIMIZING MULTIPLE DATA STREAMS THROUGHPUT FROM SINGLE HOST OR STORAGE SYSTEM TO MAXIMIZE OVERALL THROUGHPUT

FIELD OF THE INVENTION

Embodiments of the present invention generally concern backing up data. More particularly, embodiments of the invention relate to systems, hardware, computer-readable media, and methods for improving aggregate throughput in a parallel backup of multiple data streams.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While systems, hardware, computer-readable media, and methods for backing up data provide important functionality to the entity for whose benefit they are employed, the particular manner in which they are executed can result in the introduction of certain problems.

For example, there is sometimes a need to backup up multiple savesets of a single client. However, even if the backups start at the same time, they can finish at a variety of different times depending on the respective sizes of the savesets, and the throughput rate for each data stream.

Further, while some savesets may be backed up relatively quickly, the overall length of the backup window associated with the backup of the multiple savesets will be determined by the amount of time it takes to back up the largest saveset, assuming that the throughput rate for each data stream is the same. This is true even if the backups for each saveset all start at the same time.

Finally, where a first saveset is backed up sooner than a second saveset in the group, the bandwidth used for backing up the first set then becomes available. However, that bandwidth cannot be readily employed by savesets that are still being backed up. Thus, the available bandwidth is not efficiently employed.

In light of the foregoing, it would be helpful to implement methods to more efficiently employ available bandwidth for backup processes so as to shorten backup windows. As well, it would be useful to employ such methods in connection with the backup of multiple save streams from a single client, or other data source.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
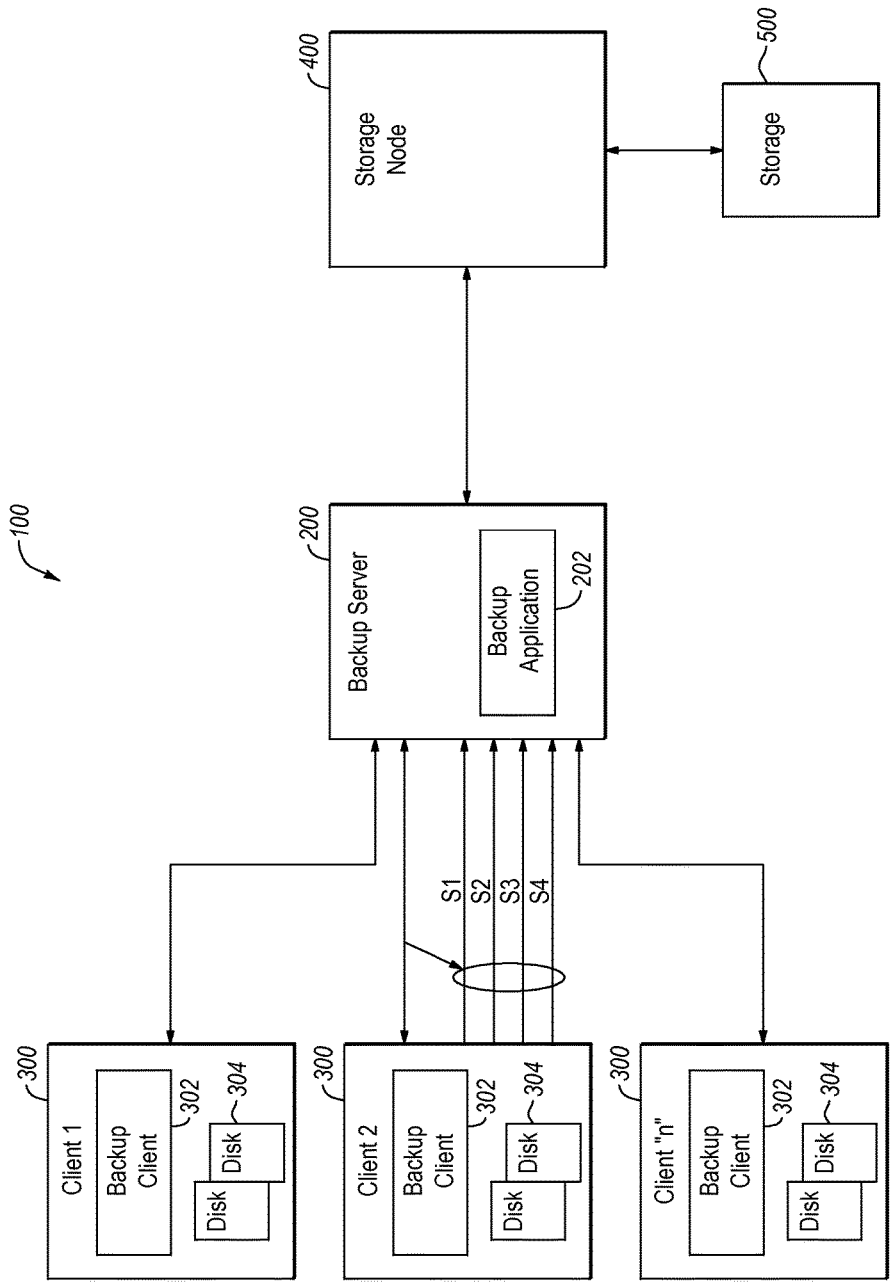
FIG. 1 is directed to aspects of an example operating environment for at least some embodiments.

Embodiments of the present invention generally concern backing up data. At least some embodiments are employed in environments where it is desired to backup multiple savesets from a single data source. More particular example embodiments of the invention relate to systems, hardware, computer-readable media and methods for improving aggregate throughput in a parallel backup of multiple data streams.

In at least some embodiments, a parallel backup of multiple savesets is performed. The savestreams all originate from a common source, or can originate from different respective sources, and may be associated with savesets of different respective sizes.

While the savesets may be of different respective sizes, the parallel backup is configured and performed such that all the backups start at substantially the same time, and end at substantially the same time. That is, the backup window is substantially the same length for each savestream.

This result can be achieved, at least in part, by defining and applying a savestream size ratio to determine a set of optimized throughput rates for the savestreams respectively associated with the savesets. Thus, in an example set of optimized throughput rates, the throughput rate for a savestream associated with a relatively smaller saveset is lower than a throughput rate for a savestream associated with a relatively larger saveset. That is, the throughput rate for a savestream is this example is proportional to the size of the saveset with which that savestream is associated.

Thus, so long as the system can support all of the selected throughput rates, the backup window for the entire backup can be relatively shorter than it would be in a case where the same throughput rate is used for each savestream, and where the savesets respectively associated with the savestreams have different sizes. In some instances however, the system may not be able to support a particular data rate.

Even if the system cannot support all the selected throughput rates for some reason, the throughput rates for one or more of the savestreams can be proportionally adjusted to be consistent with the maximum individual and/or aggregate throughput rate, or rates, that the system can support. This approach may result in a relatively longer backup window than would be associated with throughput rates greater than what the system can support, but this backup window could still be relatively shorter than if the same throughput rate were used for each savestream.

The selected throughput rates may be referred to herein as optimized rates since they represent the maximum achievable throughput rate(s) given the parameter(s) used in their determination. As noted above, one such parameter is the maximum throughput rate supported by a system. Other such parameters include total potential time to transfer data, individual saveset sizes, total data size, and total potential throughput.

As may be evident from the preceding discussion, and other disclosure herein, embodiments of the invention may provide various advantages, although it is not necessary, or required, that any particular embodiment(s) provide any particular advantage(s). Moreover, and consistent with the foregoing statement, embodiments within the scope of one or more claims may additionally, or alternatively, provide one or more advantages not specifically enumerated herein. Finally, to the extent that possible advantages are enumerated herein, those may be present in one or more embodiments in any combination.

A. Example Operating Environments

In general, embodiments of the invention may include and/or be implemented in an operating environment that includes one or more clients, at least one of which is associated with a plurality of savesets. The clients can communicate with a backup server and may include one or more applications which generate, and/or cause the generation of, data which is desired to be backed up for later restoration to the client and/or one or more other target machines. As used herein, the term data is intended to be construed broadly and includes, by way of example and not limitation, data blocks, atomic data, objects, files, directories, volumes, and any group of one or more of the foregoing.

As one or more of the clients in the operating environment may include a plurality of savesets which are desired to be backed up in parallel, various embodiments disclosed herein are directed to parallel backup and optimization methods. In general, there can be a variety of parameters that can be used to define and implement a backup process, and one or more of these parameters can be optimized given a set of values for one or more of the remaining parameters. That is, each parameter may be a function of one or more other parameters. Thus, by defining values for one or more parameters, the values of one or more other parameters can be determined using the functional relationship(s) between the parameters.

By way of illustration, the backup window associated with a given set of savestreams for a particular client, can be optimized given particular values for a particular set of backup parameters. What constitutes optimized results can vary depending upon the number and values of backup parameters specified for a backup. That is, a result that is optimum for one set of parameters may not be an optimum result for a different set of parameters.

In terms of implementation, a respective instance of a backup client is hosted by each node that participates, or may, in a backup. The backup client can interact with a backup application at the backup server to implement a parallel backup process. One or more of the backup parameters can be user-defined, such as by way of the backup server, can be predetermined, and/or can be predetermined by polling the client, possibly with the backup server, to determine its capabilities as those pertain to the backup. When the backup is completed, the backup server can transmit the backup to a storage node for saving in storage.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with one or more nodes, such as one or more clients 300, and a storage node 400. The storage node 400 can communicate with storage 500. In general, parallel backups can be restored to one or more of the clients 300 and/or any other target(s). The backup server 200, client 300 and/or storage node 400 may be physical machines, virtual machines, or any other suitable type of device.

With particular reference first to the backup server 200, some embodiments may employ a backup server 200 in the form of an EMC Avamar server or NetWorker server, although the scope of the invention is not limited to those example servers. The backup server 200 includes a backup application 202 that participates in the generation of parallel backups.

One or more of the nodes, such as client 300, with which the backup server 200 communicates can take the form of a server. It is not required that the server be any particular type of server. One or more of the client(s) 300 include a respective instance of a backup client 302 that generally operates in cooperation with the backup application 202 of the backup server 200 to create one or more parallel backups that include data that is resident on storage media 304, such as disks for example, of the client 300.

In at least some embodiments, the backup server 200 may communicate with one or more clients 300 to determine which client(s) 300 will be involved in a particular parallel backup. The backup server 200 may also start the backup by contacting the backup client 302 of the client(s) 300 that have been identified for participation in the parallel backup process.

As further indicated in FIG. 1, it may be desirable to backup data from a client 300 using a plurality of parallel savestreams. For example, 'client 2' 300 is shown as employing four savestreams, S1, S2, S3 and S4 to backup data from the storage media 304 to the backup server 200. Each of the savestreams S1, S2, S3 and S4 may correspond to a respective saveset residing at 'client 2,' and at least one saveset may have a different data size than the other savesets. For example, the data sizes of the savesets respectively associated with savestreams S1, S2, S3 and S4 may be, for example, 100 Gb, 200 Gb, 300 Gb, and 400 Gb. It should be noted that the foregoing is presented by way of example, and the scope of the invention is not limited to any particular number of savestreams from a particular client, nor to any particular data size of a saveset.

As well, each client 300 may be capable of a plurality of different throughput rates. With reference again to the example of 'client 2,' the client can employ a different throughput rate for each of the savestreams S1, S2, S3 and S4, such as 10 Gb/s, 20 Gb/s, 30 Gb/s and 40 Gb/s, for example, or may employ substantially the same throughput rate, such as 25 Gb/s for example, for one or more of those savestreams S1, S2, S3 and S4. It should be noted that the foregoing is presented by way of example, and the scope of the invention is not limited to any particular throughput rate, or group of throughput rates.

Figure 2:
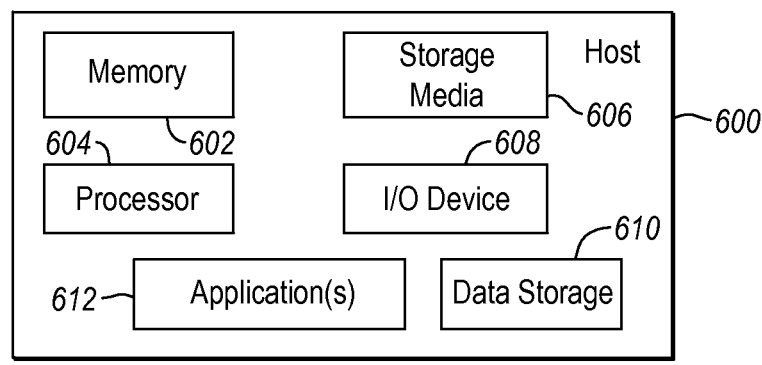
FIG. 2 is directed to an example implementation of a computing device that may be employed with at least some embodiments.

With continued reference to FIG. 1, and directing attention as well to FIG. 2, any one or more of the clients 300 and/or the backup server 200 can take the form of a computing device, one example of which is denoted at 600. In the example of FIG. 2, the computing device 600 includes a memory 602, one or more hardware processors 604, non-transitory storage media 606, I/O device 608, and data storage 610. As well, one or more applications 612 are provided that comprise executable instructions and at least some of which may generate, or cause the generation of, data that is desired to be backed up. In some instances, the applications 612 can include an instance of the backup client 302 or the backup application 202.

B. Hypothetical Backup Scenario

Figure 3:
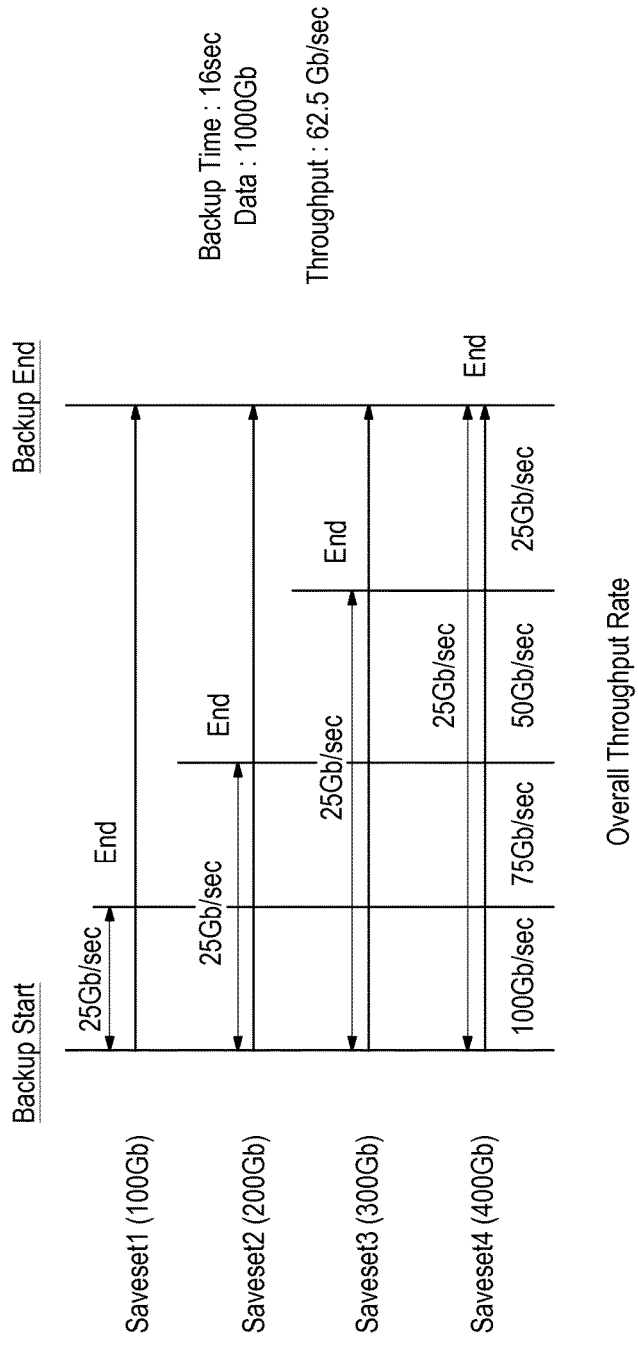
FIG. 3 is directed to a hypothetical scenario that illustrates some effects of relative saveset size on overall backup window length.

With reference now to FIG. 3, details are provided concerning a hypothetical scenario that illustrates some effects of relative saveset size on overall backup window length. In the hypothetical example of FIG. 3, a single client includes four savesets, namely, Saveset1, Saveset2, Saveset3 and Saveset 4, that each have a different respective data size, particularly, 100 Gb, 200 Gb, 300 Gb, and 400 Gb. The sum of these data sizes is the total data size for the backup, that is, 1000 Gb.

As well, the client in this hypothetical example is configured to use the same throughput rate for each saveset, namely, 25 Gb/s. Thus, the aggregate throughput capacity of the client is 100 Gb/s. Since each saveset is a different size, the backup time for a particular saveset will vary from one saveset to the next. Accordingly, the backup time for Saveset1 will be 4 seconds (100 Gb/25 Gb/s), the backup time for Saveset2 will be 8 seconds (200 Gb/25 Gb/s), the backup time for Saveset3 will be 12 seconds (300 Gb/25 Gb/s), and the backup time for Saveset4 will be 16 seconds (400 Gb/25 Gb/s).

Thus, and as indicated in FIG. 3, the total length of the backup window, 16 seconds, is dictated in this example by the data size of the largest saveset, that is, Saveset4. As well, the aggregate throughput rate is the total data size (1000 Gb) divided by the total length of the backup window (16 s), or 62.5 Gb/s.

The foregoing clearly illustrates that in this hypothetical example, the throughput capacity of the client is underutilized. In particular, and as noted above, the client has an aggregate throughput capacity of 100 Gb/s, but only 62.5 Gb/s is utilized in the illustrated example. Thus, 38.5 Gb/s of throughput capacity is available, but unused. In fact, the full 100 Gb/s of throughput capacity is only used for about 4 seconds of the 16 second backup window, namely, the period of time during which all four savestreams are running. As each backup of a Saveset is completed, the portion of throughput capacity that is being used drops, so that by the last 4 seconds of the backup window, only 25 Gb/s of a total throughput capacity of 100 Gb/s is being used.

Thus, even though the backups for all the savesets begin at the same time, the backup window is longer than necessary because the same throughput rate is used for savesets of different respective sizes. Moreover, the available throughput capacity is underutilized.

C. Example Optimized Backup Scenario

In the hypothetical example of FIG. 3 discussed above, it was demonstrated that if certain backup parameters are not appropriately selected and valued, the result can be underutilization of throughput capacity and lengthened backup windows. As indicated in that example, the throughput for the backup period was 62.5 Gb/s, though the aggregate throughput capacity was 100 Gb/s. However, the total data size of 1000 Gb, and the aggregate throughput capacity of 100 Gb/s suggest that the backup of all four savesets could be accomplished in a backup window of about 10 seconds, rather than the 16 seconds that was used. In particular, the data size of 1000 Gb divided by the aggregate throughput capacity of 100 Gb/s could result in a backup window of 10 seconds, which is significantly faster than 16 seconds.

Figure 4:
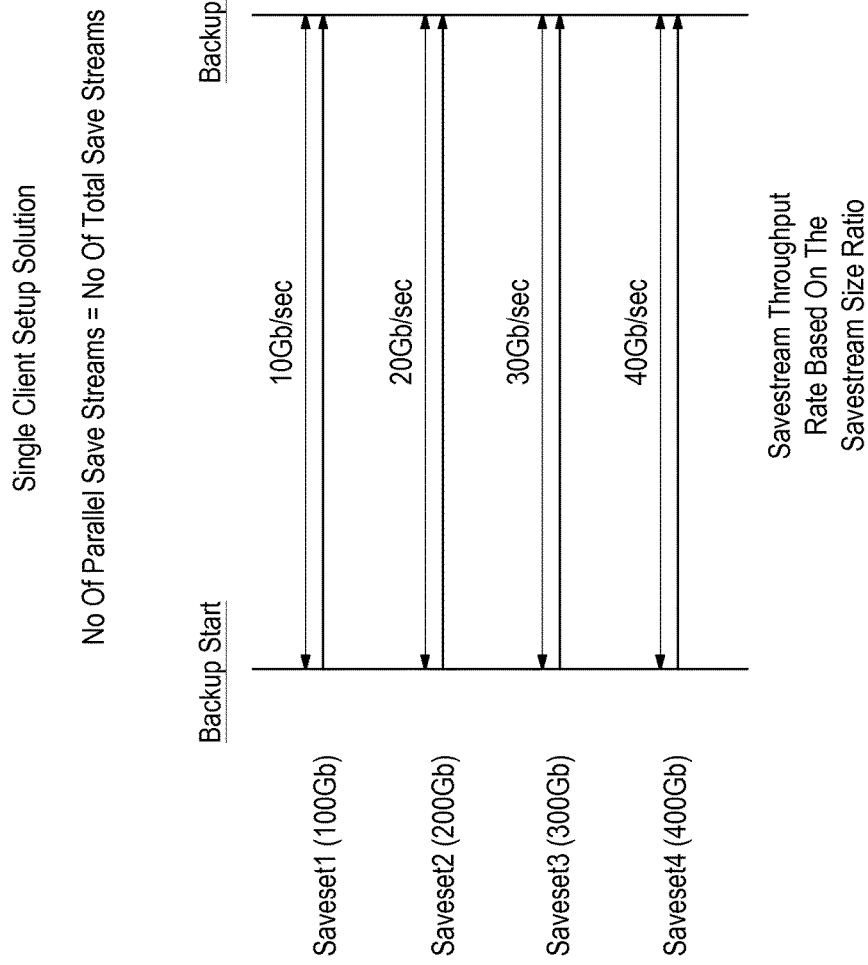
FIG. 4 discloses aspects of an example implementation of the invention where a relative increase in aggregate throughput results in a decrease in the length of a backup window.

Accordingly, and with reference now to FIG. 4, there is disclosed one example of a way in which a backup of all the Savesets can be completed in about 10 seconds. As indicated in FIG. 4, a different throughput rate has been assigned for each Saveset, and each throughput rate is proportional to a data size associated with the respective Saveset.

In particular, the ratio of the throughput rate to the data size of the associate Saveset in this particular example is 0.1. Thus, the savestream throughput rate for Saveset1 (100 Gb) is 10 Gb/s, the savestream throughput rate for Saveset2 (200 Gb) is 20 Gb/s, the savestream throughput rate for Saveset3 (300 Gb) is 30 Gb/s, and the savestream throughput rate for Saveset4 (400 Gb) is 40 Gb/s. Consequently, the backup window for each Saveset is 10 seconds, that is, the Saveset data size divided by the corresponding savestream throughput rate. Moreover, the sum of the different savestream throughput rates of 10 Gb/s, 20 Gb/s, 30 Gb/s and 40 Gb/s is 100 Gb/s, which is the aggregate savestream throughput capacity of the client in this example.

It can thus be seen from the example of FIG. 4 that by selecting savestream throughput data rates in a particular proportion to the associated saveset data sizes, the aggregate savestream throughput capacity of the client can be fully, or at least more fully, utilized. The improved utilization of the aggregate savestream throughput capacity of the client thus results in a relatively shorter backup window than would otherwise be required. That is, the individual savestream throughput data rates have been optimized, within the constraint of the aggregate savestream throughput capacity of the client, to provide better utilization of savestream throughput capacity and thus reduce the length of the overall backup window.

D. Optimization Algorithms and Example Case

Bearing the example of FIG. 4 in mind, details are now provided concerning various aspects of some example algorithms for optimization of one or more backup parameters. Although the example below refers to multiple clients each having a single saveset, it should be understood that the example and discussion apply equally well to a single client having multiple savesets to be backed up.

Consider, for example, a circumstance where there are N clients in a backup environment. The respective size of data to backed up in each client is DS1, DS2, DS3 . . . and DS(N). Also, the throughput of each client is assumed to be the same, namely, TP1, TP1, TP1 . . . TP(N). Given the aforementioned parameters, the following relationships can be defined:

$$DS(\text{Total})=\text{Sum}(DS1+DS2+DS3+ \ldots +DS(N)),$$

$$PTP(\text{Total})=\text{Sum}(TP1+TP1+TP1+ \ldots +TP(N).); \text{ and}$$

(where PTP is Total Potential Throughput)

$$PTIME(\text{total})=DS(\text{TOTAL})/PTP(\text{Total})$$

(where PTIME is Total Potential time to transfer all data)

Since, in this example, the savestream throughput data rate TP1 is the same for each client, the length of the backup window to backup all of the savesets will be a function of the size DSx of the largest saveset. As suggested by the example of FIG. 3, this circumstance would result in an actual aggregate throughput (ATP) that is less than an optimized throughput (OTP), where ATP can be calculated as follows:

$$ATP=DS(\text{Total})/(((N \times (DS1-DS0))/TP(N))+(((N-1) \times (DS2-DS1))/TP(N-1))+(((N-2) \times (DS3-DS2))/TP(N-2)) \ldots 1 \times (DS(N)-DS(N-1))/TP(1))),$$

(where DS0=0 (previous dataset size)), and
(where TP(N) is the total throughput of the existing N parallel streams)

With the foregoing in view, it will be appreciated that OTP can be calculated as follows (where 'N' is the number of the data stream):

$$OTP(N)=DS(N)/PTIME(\text{TOTAL})$$

That is, the optimal throughput can be calculated for each saveset where the total data size, total throughput rate, and saveset size are known. Following is an example illustrating calculation of the ATP, OTP, and a comparison of the two.

Example

N clients (or 1 client having N savesets with respective savestreams), where:
N=3;
data sizes are 20, 30 and 50 GB respectively; and
write speed for each client is 10 Gb/s.
Thus:

$$DS(\text{Total})=(20+30+50)=100 \text{ GB};$$

$$PTP(\text{Total})=(10+10+10)=30 \text{ Gb/s; and}$$

$$PTIME=100/30=3.33 \text{ sec.}$$

Figure 5:
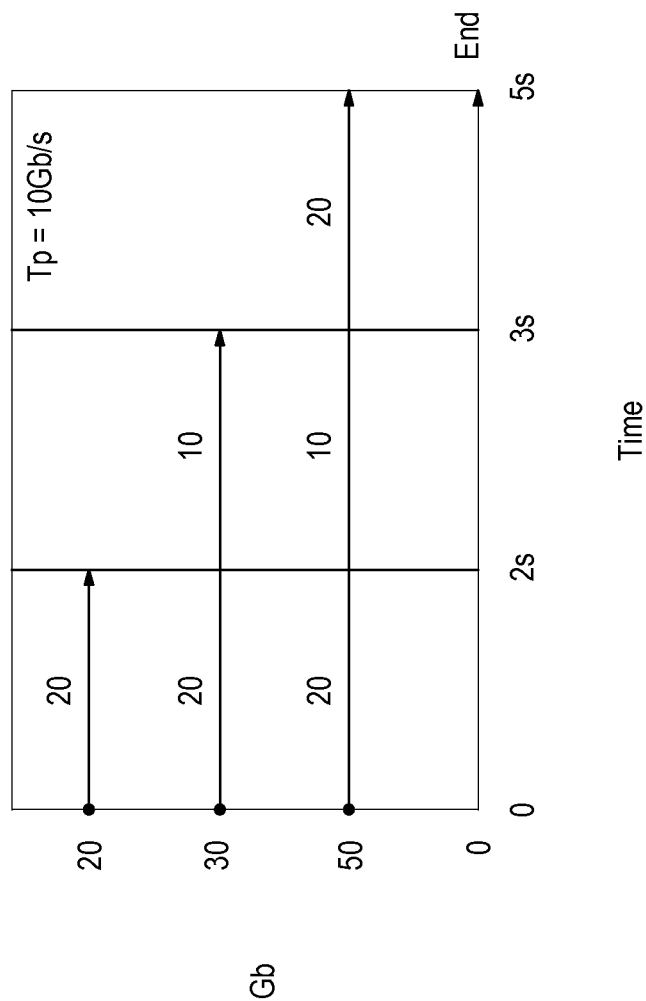
FIG. 5 is a flow chart that discloses aspects of an example method for determining an optimized throughput rate.

A calculation of ATP, and comparison with PTP, reveals that ATP is less than PTP and, thus, not optimal. In particular:

$$ATP=100/(((3*20)/10)+((2*30)/10)+(1*50)/10))=100/17=5.88 \text{ Gb/s; and}$$

$$PTP(\text{calculated above})=30 \text{ Gb/s.}$$

Where the backup window is 5 seconds long (50 Gb/10 Gb/s) and includes a first segment of 2 seconds, a second segment of 1 second, and a third and final segment of 2 seconds (see FIG. 5):

3*20=3 savestreams each transmit 20 Gb in the first 2 seconds of the backup window (calculated by: data size 20/write speed 10);

2*30=2 save streams each transmit 30 Gb in the first 3 seconds of the backup window (calculated by: data size 30/write speed 10); and 1*50=1 save stream transmits 50 Gb over the entire 5 seconds of the backup window (calculated by: data size 50/write speed 10).

In the foregoing example, ATP (5.88 Gb/s) is less than PTP (30 Gb/s) and, accordingly, the throughput rates of this example are susceptible to optimization. In particular, OTP can be calculated for each savestream individually, and for the entire data transfer by employing the PTIME ratio (100/30) thus:

$$OTP1=20 \text{ Gb/s}/3.33=6 \text{ Gb/s}$$

$$OTP2=30 \text{ Gb/s}/3.33=9 \text{ Gb/s}$$

$$OTP3=50 \text{ Gb/s}/3.33=15 \text{ Gb/s}$$

$$OTP(\text{total})=6+9+15=30 \text{ Gb/s.}$$

The foregoing calculations demonstrate that the sum of the savestream data rates (30 Gb/s) equals the PTP, thus confirming: that the example transfer of 100 Gb/s is within the transfer capability of the client; the complete backup can be effected in 3.33 seconds; and, all of the saveset backups start at the same time, and end at the same time.

E. Example Throughput Optimization Method

Figure 6:
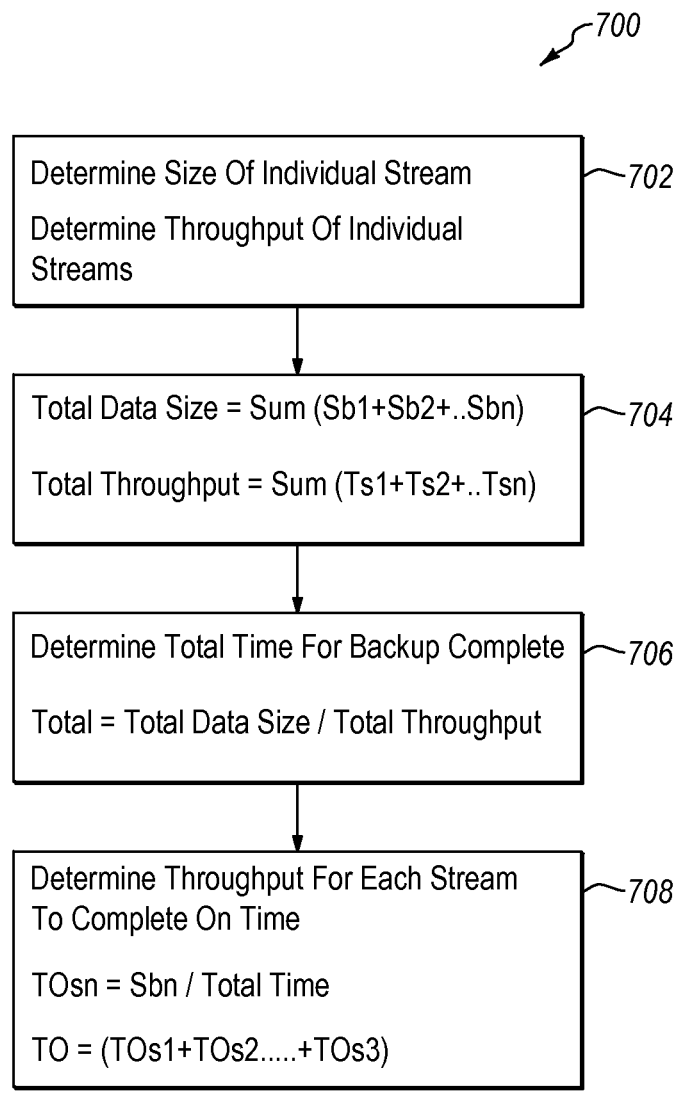
FIG. 6 is a flow chart that discloses aspects of an example method for determining a set of optimized throughput rates.

With reference now to FIG. 6, details are provided concerning an example method for determining a set of optimized savestream throughput rates, given a total data size of the savesets associated with the savestreams, a total throughput, and individual data sizes of the savesets.

One example of such a method is denoted at 700 and begins at 702 where determinations are made concerning the respective data sizes DS associated with each of a plurality of savesets, and concerning a respective savestream throughput rate TP for each savestream associated with a respective data set. At 704, the total data size DS (total) is determined by summing the individual data sizes of the savesets, and a total throughput PTP (total) is determined by summing the individual savestream throughput rates. If the total throughput rate PTP (total) exceeds system capabilities, the total throughput rate can be adjusted downward as necessary to fall within system capabilities. This can be accomplished, for example, by proportionately reducing each of the individual savestream throughput rates TP.

Next, a backup window length PTIME is calculated 706. This is performed by dividing the total data size DS (total) by the total throughput PTP (total). The ratio of total data size DS (total) to the total throughput PTP (total) can then be used to determine the individual savestream throughput rates.

In particular, the method 700 advances to 708 and, assuming 'n' savestreams, the savestream throughput rate for savestream 'n' can be determined by dividing an individual data size DS (n) by PTIME thus: DS (n)/PTIME. When the individual savestream throughput rates have all been calculated, they can be summed to confirm that the total of all the individual savestream throughput rates equals DS (total).

F. Example Backup Method

Figure 7:
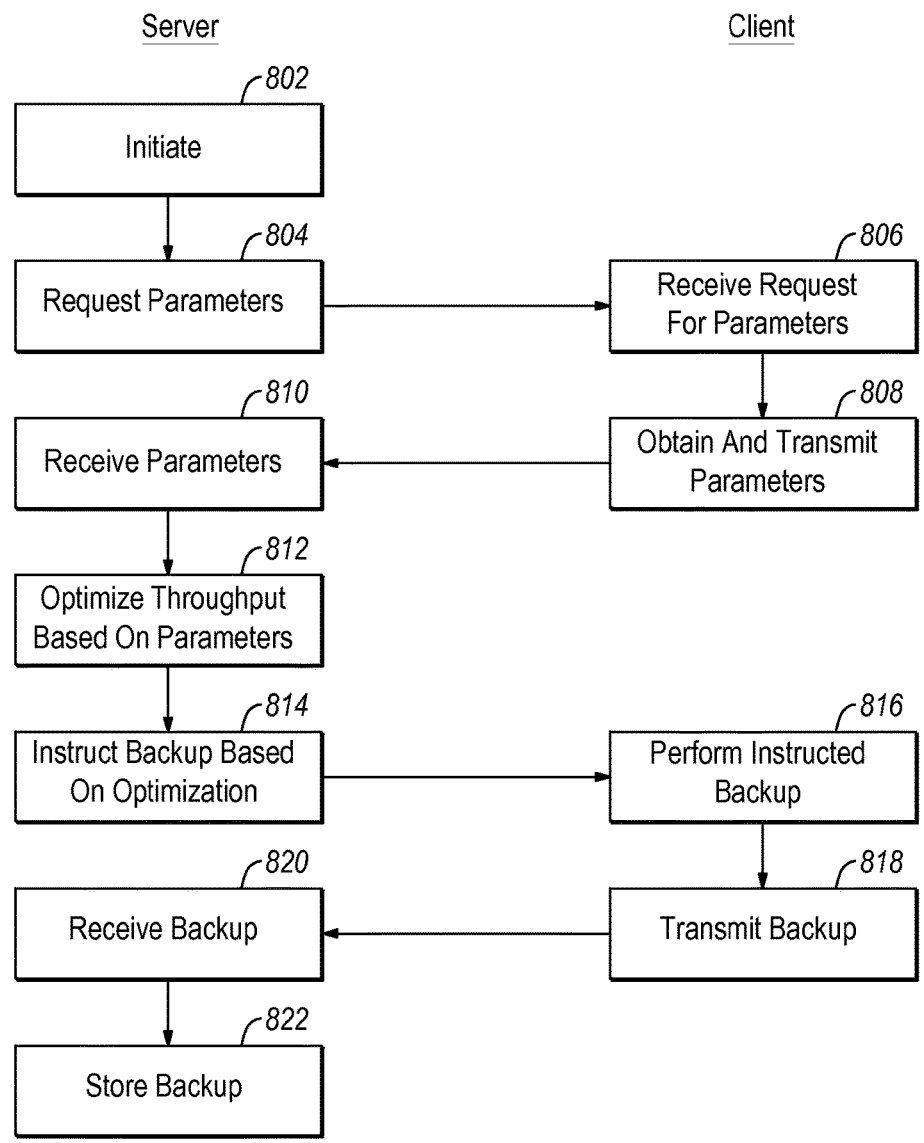
FIG. 7 is a directed to an example embodiment of a backup method.
Figure 7:
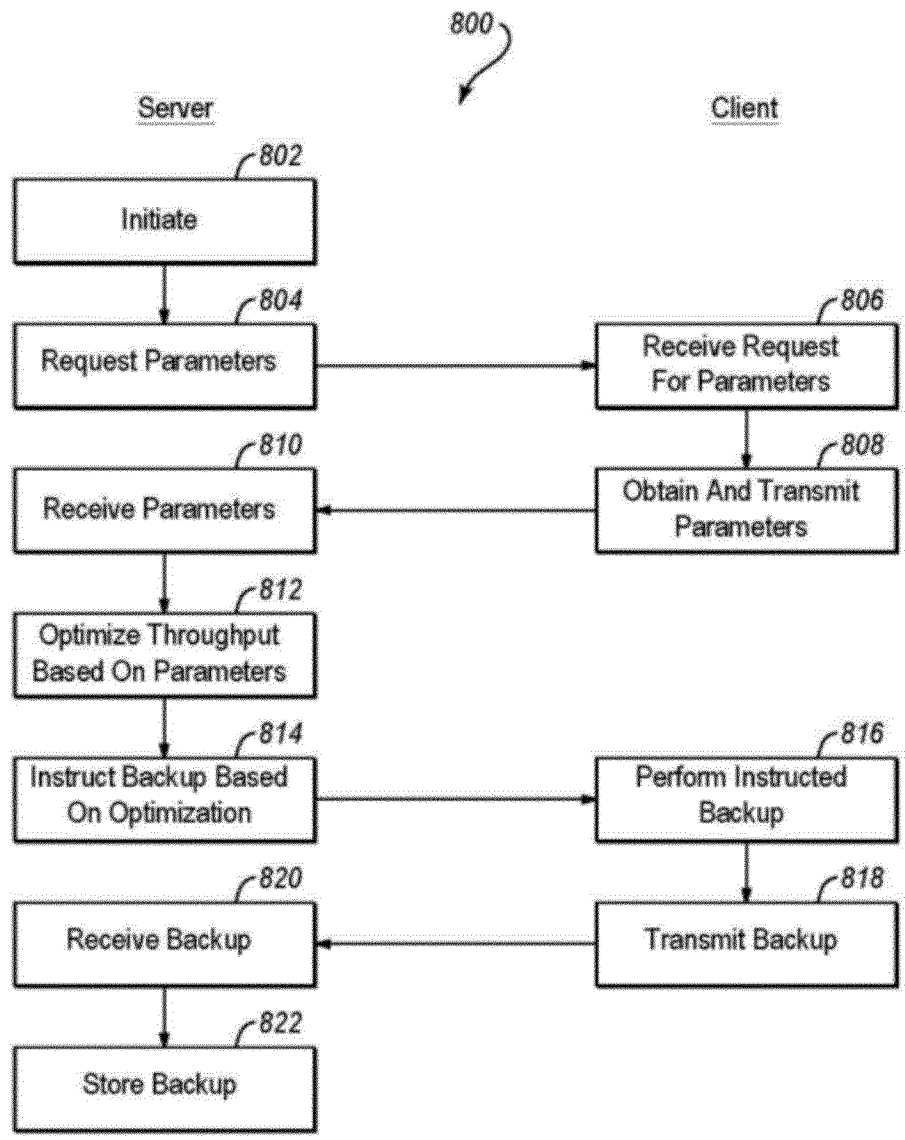

Turning finally to FIG. 7, details are provided concerning a backup method that is performed using an optimization technique disclosed herein. One example of the method is denoted at 800 and begins at 802 where the backup is initiated. The backup can be initiated 802 by a user accessing a UI at a backup server, or the backup can be initiated 802 automatically according to a predetermined time schedule, or at the occurrence or non-occurrence of an event.

After the backup has been initiated 802, a request 804 is made to obtain one or more parameters relating to the backup intended to be performed. Example parameters include, but are not limited to, the maximum throughput rate supported by a client whose data is the subject of the backup, total potential time available, or desired, to transfer data, individual saveset sizes, total data size, and total potential throughput. In some instances, and as indicated in FIG. 7, the parameter request may be sent from the backup server and received 806 by the client. However, the parameters may alternatively reside on the backup server, or can be provided by a user. Moreover, one or more parameters can be provided by any combination of the foregoing mechanisms. Where the parameter request, or part of a parameter request, is directed to a client, the client then obtains 808 and transmits to the backup server the values of the requested parameters.

The backup server then receives 810 the parameters and uses some, or all, of the parameter as a basis to optimize 812 the throughput rate for the client to transmit one or more savestreams to the server. In some embodiments, optimization of the throughput rate can take place at the client, rather than at the backup server. Once the throughput rate has been optimized, the backup server then instructs 814 the backup to be performed in accordance with the optimized throughput rate. As noted herein, the backup can be performed in connection with one or more other parameters as well. The client then receives the backup instructions and performed 816 the backup in accordance with the optimized throughput rate and any other specified parameters.

When the client has completed the backup, the finished backup is then transmitted 818 to the backup server for storage. The backup server receives 820 the completed backup and then stores 822 the backup. The storage of the backup can occur locally at the backup server, or by way of a storage node that accesses storage.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising performing the following operations:

calculating a total saveset size DS(total) for a backup by summing sizes DS(n) of each of 'n' savesets using the formula: DS (total)=Sum (DS1+DS2+DS3+ . . . +DS (n)), wherein each of the savesets is associated with a respective savestream, and a respective throughput rate TP for each of the 'n' savesets is determined based on (i) a total throughput capacity of a source of the savestream corresponding to the saveset, and (ii) a size of that saveset;

calculating a total throughput rate PTP (total) for the backup by summing the respective throughput rates TP of each of the 'n' savesets using the formula PTP (Total)=Sum (TP1+TP1+TP1+ . . . +TP(n));

calculating a total backup window length PTIME(total) using the following formula: PTIME(total)=DS(total)/PTP (total);

calculating an aggregate throughput data rate ATP for the backup using the formula:

ATP=DS (total)/(((n×(DS1−DS0)/TP(n))+(((n−1)×(DS2−DS1))/TP(n−1))+ . . . (((1×(DS(n)−DS(n−1)/TP(1))), where DS0=0 (previous dataset size), where TP(n) is the respective throughput rate TP for each of the 'n' savesets, and where the corresponding savesets for n . . . 1 appear in ascending order of size;

determining that the aggregate throughput data rate ATP based on DS(total), respective throughput rates TP, and DS(n) is less than the total throughput rate PTP(total);

in response to the determination, calculating a respective optimized savestream throughput rate OTP(n) individually for each of the 'n' savesets using the following formula:

OTP(n)=DS(n)/PTIME(total), where one or more values of OTP(n)≠TP;

calculating a sum of all respective optimized savestream throughput rate using the formula:

OTP(total)=Sum (OTP(1)+OTP(2)+ . . . +OTP(n)), to confirm that the OTP(total) is equal to the total throughput rate PTP(total), thus confirming that (i) the respective optimized savestream throughput rates OTP (n) provide better utilization of the total throughput capacity of the source of the savestream corresponding to the saveset, and (ii) the backup of all savestreams can be effected in a PTIME (total) window that is shorter than an available backup window, wherein all savestreams start at substantially the same time, and all savestreams end at substantially the same time;

backing up the 'n' savesets using the respective optimized savestream throughput rate OTP(n) for each of the 'n' savesets.

2. The method as recited in claim 1, wherein the method is performed by a client and/or server.

3. The method as recited in claim 1, wherein each savestream is received from a different respective node.

4. The method as recited in claim 1, wherein each savestream is received from a common node.

5. The method as recited in claim 1, wherein a first optimized savestream throughput rate OTP (1) is different from a second optimized savestream throughput rate OTP (2).

6. A non-transitory storage medium having stored therein computer-executable instructions which, when executed by one or more hardware processors, perform the following operations:

calculating a total saveset size DS(total) for a backup by summing sizes DS(n) of each of 'n' savesets using the formula: DS (total)=Sum (DS1+DS2+DS3+ . . . +DS (n)), wherein each of the savesets is associated with a respective savestream, and a respective throughput rate TP for each of the 'n' savesets is determined based on (i) a total throughput capacity of a source of the savestream corresponding to the saveset, and (ii) a size of that saveset;

calculating a total throughput rate PTP(total) for the backup by summing the respective throughput rates TP of each of the 'n' savesets using the formula PTP (Total)=Sum (TP1+TP1+TP1+ . . . +TP(n));

calculating a total backup window length PTIME(total) using the following formula: PTIME(total)=DS(total)/PTP (total);

calculating an aggregate throughput data rate ATP for the backup using the formula:

ATP=DS (total)/(((n×(DS1−DS0)/TP(n))+(((n−1)×(DS2−DS1))/TP(n−1))+ . . . (((1×(DS(n)−DS(n−1)/TP(1))), where DS0=0 (previous dataset size), where TP(n) is the respective throughput rate TP for each of the 'n' savesets, and where the corresponding savesets for n . . . 1 appear in ascending order of size;

determining that the aggregate throughput data rate ATP based on DS(total), respective throughput rates TP, and DS(n) is less than the total throughput rate PTP(total);

in response to the determination, calculating a respective optimized savestream throughput rate OTP(n) individually for each of the 'n' savesets using the following formula:

OTP(n)=DS(n)/PTIME(total), where one or more values of OTP(n)≠TP;

calculating a sum of all respective optimized savestream throughput rate using the formula:

OTP(total)=Sum (OTP(1)+OTP(2)+ . . . +OTP(n)), to confirm that the OTP(total) is equal to the total throughput rate PTP(total), thus confirming that (i) the respective optimized savestream throughput rates OTP (n) provide better utilization of the total throughput capacity of the source of the savestream corresponding to the saveset, and (ii) the backup of all savestreams can be effected in a PTIME (total) window that is shorter than an available backup window, wherein all savestreams start at substantially the same time, and all savestreams end at substantially the same time;

backing up the 'n' savesets using the respective optimized savestream throughput rate OTP(n) for each of the 'n' savesets.

7. The non-transitory storage medium as recited in claim 6, wherein:

the non-transitory storage medium is an element of a physical backup server; or the non-transitory storage medium is an element of a physical client.

8. The non-transitory storage medium as recited in claim 6, wherein each savestream is received from a different respective node.

9. The non-transitory storage medium as recited in claim 6, wherein each savestream is received from a common node.

10. The non-transitory storage medium as recited in claim 6, wherein a first optimized savestream throughput rate OTP (1) is different from a second optimized savestream throughput rate OTP (2).

11. A physical device, wherein the physical device comprises:

one or more hardware processors; and a non-transitory storage medium having stored therein computer-executable instructions which, when executed by the one or more hardware processors, perform the following operations:

calculating a total saveset size DS(total) for a backup by summing sizes DS(n) of each of 'n' savesets using the formula: DS (total)=Sum (DS1+DS2+DS3+ . . . +DS (n)), wherein each of the savesets is associated with a respective savestream, and a respective throughput rate TP for each of the 'n' savesets is determined based on (i) a total throughput capacity of a source of the savestream corresponding to the saveset, and (ii) a size of that saveset;

calculating a total throughput rate PTP(total) for the backup by summing the respective throughput rates TP of each of the 'n' savesets using the formula PTP (Total)=Sum (TP1+TP1+TP1+ . . . +TP(n));

calculating a total backup window length PTIME(total) using the following formula: PTIME(total)=DS(total)/PTP (total);

calculating an aggregate throughput data rate ATP for the backup using the formula:

ATP=DS (total)/(((n×(DS1−DS0)/TP(n))+(((n−1)×(DS2−DS1))/TP(n−1))+ . . . (((1×(DS(n)−DS(n−1)/TP(1))), where DS0=0 (previous dataset size), where TP(n) is the respective throughput rate TP for each of the 'n' savesets, and where the corresponding savesets for n . . . 1 appear in ascending order of size;

determining that the aggregate throughput data rate ATP based on DS(total), respective throughput rates TP, and DS(n) is less than the total throughput rate PTP(total);

in response to the determination, calculating a respective optimized savestream throughput rate OTP(n) individually for each of the 'n' savesets using the following formula:

OTP(n)=DS(n)/PTIME(total), where one or more values of OTP(n)≠TP;

calculating a sum of all respective optimized savestream throughput rate using the formula:

OTP(total)=Sum (OTP(1)+OTP(2)+ . . . +OTP(n)), to confirm that the OTP(total) is equal to the total throughput rate PTP(total), thus confirming that (i) the respective optimized savestream throughput rates OTP (n) provide better utilization of the total throughput capacity of the source of the savestream corresponding to the saveset, and (ii) the backup of all savestreams can be effected in a PTIME (total) window that is shorter than an available backup window, wherein all savestreams start at substantially the same time, and all savestreams end at substantially the same time;

backing up the 'n' savesets using the respective optimized savestream throughput rate OTP(n) for each of the 'n' savesets.

12. The non-transitory storage medium as recited in claim 6, wherein a ratio of OTP(n)/DS(n) is the same for each value of 'n'.

13. The physical device as recited in claim 11, wherein each savestream is received from a different respective node.

14. The physical device as recited in claim 11, wherein each savestream is received from a common node.

15. The physical device as recited in claim 11, wherein a first optimized savestream throughput rate OTP (1) is different from a second optimized savestream throughput rate OTP (2).

16. The physical device as recited in claim 11, wherein a ratio of OTP(n)/DS(n) is the same for each value of 'n'.

* * * * *

UNITED STATES PATENT AND TRADEMARK OFFICE
CERTIFICATE OF CORRECTION

PATENT NO. : 10,204,018 B1  
APPLICATION NO. : 14/326275  
DATED : February 12, 2019  
INVENTOR(S) : Gupta et al.

Page 1 of 2

It is certified that error appears in the above-identified patent and that said Letters Patent is hereby corrected as shown below:

In the Drawings

Sheet 7, replace Fig. 7 with the figure depicted on the attached sheet where reference number 800 has been added.

Signed and Sealed this  
Thirtieth Day of April, 2019

Andrei Iancu  
*Director of the United States Patent and Trademark Office*